United States Patent [19]
Alinari

[11] 3,908,462
[45] Sept. 30, 1975

[54] BOURDON TUBE TYPE PRESSURE MEASURING INSTRUMENT

[76] Inventor: Carlo Alinari, Corso Vittorio Emanuele 200, Turin, Italy

[22] Filed: Nov. 23, 1973

[21] Appl. No.: 418,456

[30] Foreign Application Priority Data
Nov. 28, 1972 Italy .................... 70737/72

[52] U.S. Cl. ................................. 73/418
[51] Int. Cl.² ................................ G01L 7/04
[58] Field of Search ................... 73/411–418

[56] References Cited
UNITED STATES PATENTS
1,322,463  11/1919  Nelson .................. 73/411
1,894,153  1/1933  Brietzke ................ 73/418

*Primary Examiner*—Donald O. Woodiel

[57] ABSTRACT

A Bourdon tube type pressure gauge in which a small metal bracket is applied to the fixed end of the Bourdon tube. One side of the bracket is integral with the supporting frame for the movable members, and the other side of the bracket is shaped as to be inserted in the Bourdon tube with the tube used to evacuate the Bourdon tube.

4 Claims, 7 Drawing Figures

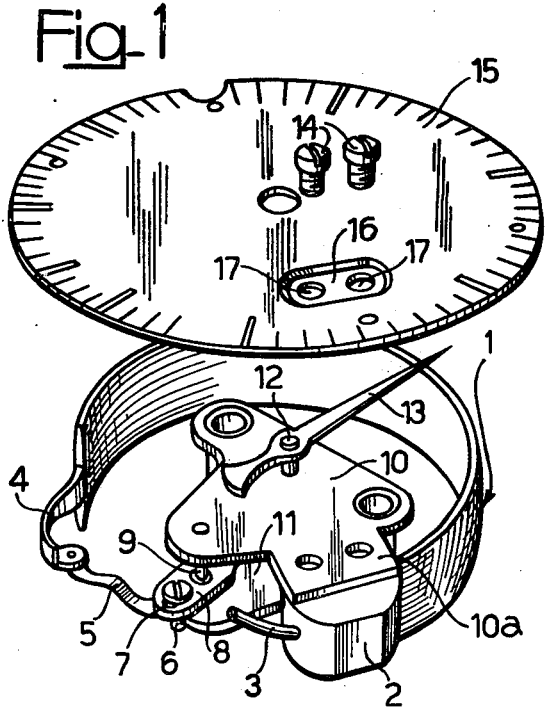
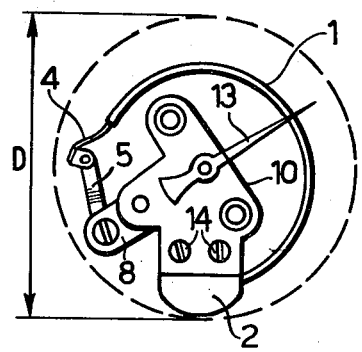
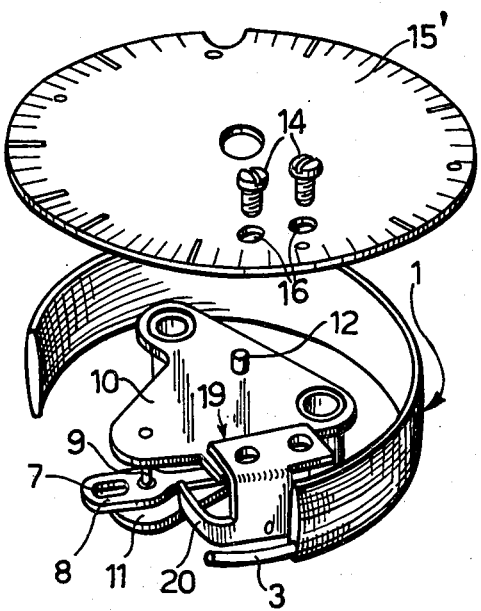
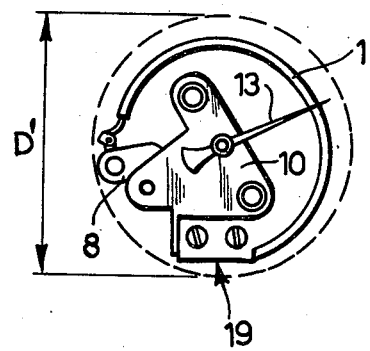

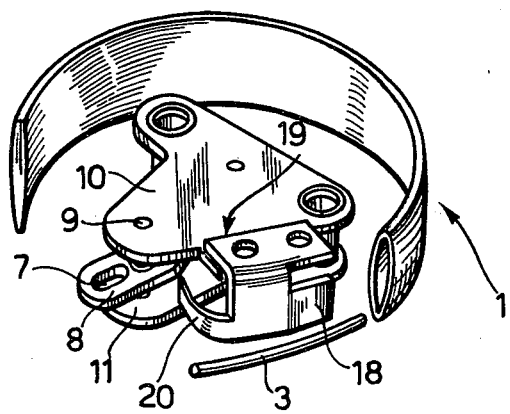
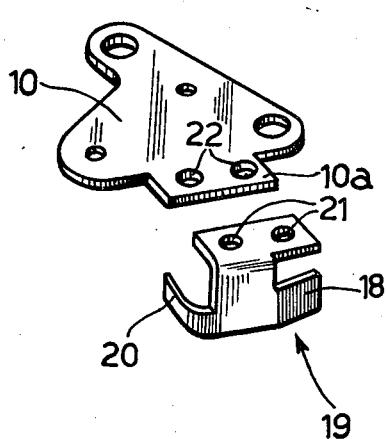
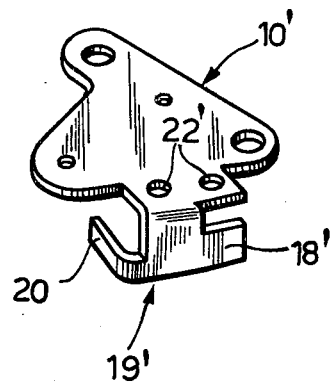

BOURDON TUBE TYPE PRESSURE MEASURING INSTRUMENT

The present invention relates to the Bourdon tube type pressure gauges, with a particular reference to the ones used to measure depths.

As known, the Bourdon tube is an elastic tubular element having a curvilinear axis and an oval cross section, which is fixed at one end and whose curvature variations caused by the difference between the inner and the outer pressure, with respect to the tube are utilized to measure said pressure difference. To this purpose, one end of the tube, is fixed to a frame carrying a mobile pointer and possibly means to amplify the transmission of the pointer movements, while its other free end is connected through elements which are pivoted on the movement transmission member which is generally formed by a lever with two arms, carrying at one end a toothed sector meshing with a pinion fixedly connected to the pointer shaft.

In the known instruments of said type, the fixed end of the Bourdon tube is sealingly anchored to a metal block connected by means of screws to the frame supporting the mobile parts. Said block is generally obtained from a drawn bar, normally a brass bar and it has to be submitted to mechanical tooling to form the tube seat and the seat for a small tube which is used to make the vacuum within the tube after the complete assembling.

This construction type presents various drawbacks which may be summarized as follows:

a remarkable weight and width dimension of the instrument;

a high number of mechanical toolings to be made on the block;

possible deformation when welding the tube onto the block and a considerable cost of same welding due to the considerable material mass to be heated;

possible leakages during the use caused by possible porosities of the bar from which the metal block is obtained; and the necessity of applying an adjustable reference to reset the instrument when calibrating it.

The present invention aims at the overcoming of said drawbacks by the provision of a pressure gauge instrument of the said type having a simplified construction reduced dimensions and free from leakages, due to defects of the material employed, during the use of the instrument.

Another object of present invention is to provide an instrument of said type wherein the possible deformation of the parts during the tube welding is minimized as well as the amount of heat necessary for same welding.

The main particular feature of the instrument according to the invention resides in that the fixed end of the Bourdon tube, is applied to a small metal bracket one side of which is integral with the supporting frame for the mobile members and the other side is so shaped as to may be inserted in the tube, together with the small tube used to evacuate same tube, and welded to said parts.

Further particular features and advantages of the invention will result from the following specification, referred to the accompanying drawings given only as non limiting examples and wherein:

FIG. 1 is a partially disassembled perspective view of an instrument to measure pressures, of the conventional type;

FIG. 2 is a schematic plan view illustrating the dimensions of the FIG. 1 instrument;

FIG. 3 is a partially disassembled perspective view of an instrument according to the invention;

FIG. 4 is analogous to FIG. 2 and illustrates in a plan view the dimensions of the instrument according to the invention;

FIG. 5 is an exploded perspective view of the same;

FIG. 6 is an exploded perspective view of the small bracket and a section of the frame, and FIG. 7 is a perspective view illustrating a construction variant of the parts illustrated on FIG. 6.

FIG. 1 illustrates a Bourdon tube pressure gauge instrument of the conventional type; 1 indicates the elastic curvilinear tube having an elliptical cross section, one end of wich is sealingly connected to a metal block 2 obtained from a bar and from which protrudes, in a position opposite to the tube, a small tube 3 communicating with the interior of the tube and which is used to evacuate same tube.

The other end of the tube, which is sealingly closed, presents a shaped appendix 4 which is connected, by means of an intermediate element acting as a connecting rod 5, to a lever 8 with two arms mounted for oscillation about a vertical pin 9 supported by a fixed frame comprising two parallel plates 10, 11 connected by spacers.

The connecting rod 5 is connected to lever 8 by a pin 6 mounted in a slot 7 of the lever in order to make adjustable the position of pin 6.

The lever 8 carries at its opposed end a toothed sector, not shown in the drawings, which meshes with a pinion applied to a shaft 12 carrying a mobile pointer 13. The pointer co-operates with a graduate dial 15 fixed by screws 14 onto the upper plate 10 of the frame; same screws are also utilized to secure the metal block 2 to same frame.

As the dial must be slightly rised with respect to the upper plate 10 of the frame, its zone wherein it is secured to the frame, is provided with a daubing 16 having two holes 17 for screws 14.

This type of instrument presents in plan view a remarkable dimension, measured by the diameter D (see FIG. 2) which is determined by the presence of block 2.

The following figures illustrate an instrument according to the invention, wherein the fixed end of the Bourdon tube is secured to a tongue 18 integral with a bracket element 19 carried by the upper plate 10 of the frame. Tongue 18 has substantially a rectangular shape and a transversal extension smaller than the greater axis of the tube cross section whereby, when said tongue is inserted in the tube cavity it still remains the place to insert and apply parallelly to the tongue, the small tube 3 which will be utilized for the evacuation of the Bourdon tube. Said three elements, namely, the end of the Bourdon tube 1, the tongue 18 and the small tube 3, are together sealingly secured by welding.

Bracket 19 may be independent from the frame, as illustrated on FIGS. 3, 5, 6; in this case, the upper side of bracket 19 is provided with through holes 21 which allow the clamping of same bracket to plate 10 of the frame with screws co-operating with threaded holes 22 formed in a protruding part 10a of the frame. It is to be noted that the protruding part 10a is also present in the conventional construction and it is utilized for the clamping of the metal block 2, but in such cases the protruding part has a greater extension due to the dimensions of the block.

If the bracket 19 is inserted, the dials 15' used may be free of central daubing but simply provided with holes 16 for the clamping, by means of screws 14, to the bracket and the upper plate 10 of the frame.

The smaller extension of the bracket 19 protruding part allows the reduction of the instrument diameter, which is indicated in D' on FIG. 4.

To simplify the construction, bracket 19' may be integrally made with the upper plate 10' as illustrated on FIG. 7.

In both cases, bracket 19 or 19' may be provided with an appendix 20 opposed to tongue 18 or 18' which supports the Bourdon tube; said appendix will be deformed by hand when effecting the assembling to act as a reference stop against which the mobile level 8, integral with the toothed sector, bears for the resetting of the instrument.

The described construction, concerning the use of the bracket instead of the conventional block, the bracket being or not integrally made with the frame, allows the reduction of weight and dimensions of the instrument and the elimination of an appreciable part of the mechanical toolings which had to be effected onto the block to make it suitable for the use. Further, the welding needs a reduced heating due to the smaller material mass, with the consequent reduction of deformation possibility. The omission of the block allows also to eliminate the danger of leakages due to possible porosity of the block.

While keeping unchanged the principle of the invention, the embodiments and the constructive details may be widely varied with respect to the described and illustrated ones without departing from the scope of the present invention.

I claim:

1. Bourdon tube pressure gauge of the type comprising a Bourdon tube with a tubular and elastic element having a curved axis and an elliptical cross section, one end of which is connected to a carrier frame having an upper and lower plate while the other end actuates a kinematic arrangement which transmits a rotary motion to a pointer cooperating with a dial and an evacuation tube, characterized in that said evacuation tube and a metal bracket shaped to be inserted into the fixed end of the Bourdon tube one side of said metal bracket being integral with the frame supporting the mobile members and the other is shaped to be inserted in said tubular element, together with said evacuation tube with said tube and said bracket being welded to said Bourdon tube.

2. Instrument according to claim 1, characterized in that the bracket is independent and attached to the upper plate of the frame.

3. Instrument according to claim 1, characterized in that the bracket is a part of the upper plate of the frame.

4. Instrument according to claim 1 characterized in that the bracket includes a deformable appendix which acts as a reference stop for the oscillating lever.

* * * * *